(12) United States Patent
Li et al.

(10) Patent No.: US 10,299,559 B2
(45) Date of Patent: May 28, 2019

(54) SINGLE PHASE PERMANENT MAGNET MOTOR AND HAIR DRYER USING THE SAME

(71) Applicant: JOHNSON ELECTRIC INTERNATIONAL AG, Murten (CH)

(72) Inventors: Yue Li, Hong Kong (CN); Chui You Zhou, Shenzhen (CN); Jie Chai, Shenzhen (CN); Tao Zhang, Shenzhen (CN); Qiang Zhou, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 246 days.

(21) Appl. No.: 15/246,994

(22) Filed: Aug. 25, 2016

(65) Prior Publication Data
US 2017/0055669 A1 Mar. 2, 2017

(30) Foreign Application Priority Data

Aug. 28, 2015 (CN) .......................... 2015 1 0545984

(51) Int. Cl.
*H02K 1/14* (2006.01)
*H02K 1/16* (2006.01)
(Continued)

(52) U.S. Cl.
CPC .............. *A45D 20/12* (2013.01); *H02K 1/14* (2013.01); *H02K 1/145* (2013.01); *H02K 1/148* (2013.01);
(Continued)

(58) Field of Classification Search
CPC .......... A45D 20/12; H02K 1/14; H02K 1/145; H02K 1/148; H02K 1/16; H02K 1/2706;
(Continued)

(56) References Cited

U.S. PATENT DOCUMENTS

| | | | | | |
|---|---|---|---|---|---|
| 1,929,513 | A | * | 10/1933 | Peelle | H02K 17/12 310/166 |
| 2,486,435 | A | * | 11/1949 | Rex | H02K 17/30 310/166 |

(Continued)

FOREIGN PATENT DOCUMENTS

| | | | | |
|---|---|---|---|---|
| DE | 202016104041 U1 | * | 11/2016 | ............. H02K 29/03 |
| EP | 1 103 202 A1 | | 5/2001 | |

(Continued)

*Primary Examiner* — Stephen M Gravini
(74) *Attorney, Agent, or Firm* — Muncy, Geissler, Olds & Lowe, P.C.

(57) ABSTRACT

A single phase motor and a hair dryer are provided. The motor includes a stator and a rotor. The stator includes a stator core and a stator winding. The stator core includes an outer ring portion, teeth extending inwardly from the outer ring portion, and two pole shoes extending from a distal end of each tooth. A winding slot is formed between each two adjacent teeth. A slot opening is disposed between the pole shoes of the adjacent teeth, and is offset from one of the two adjacent teeth. The air supplying unit includes the single phase motor and an impeller. The startup angle and cogging torque of the motor are adjustable by adjusting the position/width of the slot opening, without the need of additional positioning slots or positioning holes defined at the pole shoes, which makes the motor structure simple.

19 Claims, 13 Drawing Sheets

(51) Int. Cl.
*H02K 1/27* (2006.01)
*H02K 3/12* (2006.01)
*A45D 20/12* (2006.01)
*H02K 19/04* (2006.01)
*H02K 21/16* (2006.01)
*H02K 29/03* (2006.01)

(52) U.S. Cl.
CPC ............ *H02K 1/16* (2013.01); *H02K 1/2706* (2013.01); *H02K 1/278* (2013.01); *H02K 3/12* (2013.01); *H02K 19/04* (2013.01); *H02K 29/03* (2013.01); *H02K 21/16* (2013.01); *H02K 2201/03* (2013.01)

(58) Field of Classification Search
CPC .......... H02K 1/278; H02K 3/12; H02K 19/04; H02K 29/03; H02K 21/16; H02K 2201/03
USPC ...................................................... 34/95–100
See application file for complete search history.

(56) References Cited

U.S. PATENT DOCUMENTS

| | | | | |
|---|---|---|---|---|
| 3,005,117 A | * | 10/1961 | Buchhold | H01P 7/02 310/1 |
| 3,469,134 A | * | 9/1969 | Bering | H02K 19/24 310/164 |
| 4,600,864 A | * | 7/1986 | Sato | H02K 29/08 310/156.12 |
| 4,636,676 A | * | 1/1987 | Bertram | H02K 21/18 310/156.08 |
| 4,808,868 A | * | 2/1989 | Roberts | H02K 3/16 310/184 |
| 5,015,903 A | * | 5/1991 | Hancock | H02K 19/103 310/168 |
| 5,041,749 A | * | 8/1991 | Gaser | H02K 21/16 310/156.22 |
| 5,250,867 A | * | 10/1993 | Gizaw | H02K 21/16 310/156.12 |
| 5,670,836 A | * | 9/1997 | Horst | H02K 21/16 310/156.15 |
| 5,773,908 A | * | 6/1998 | Stephens | H02K 1/146 310/156.47 |
| 5,825,108 A | * | 10/1998 | De Filippis | H02K 21/22 310/67 R |
| 6,097,127 A | * | 8/2000 | Rivera | H02K 3/28 310/156.12 |
| 6,583,531 B1 | * | 6/2003 | Asano | H02K 1/08 310/156.22 |
| 6,850,019 B2 | * | 2/2005 | Gerfast | H02P 6/085 310/156.01 |
| 7,750,529 B2 | * | 7/2010 | Tajima | H02K 5/12 310/257 |
| 7,923,879 B2 | * | 4/2011 | Nitta | H02K 1/2786 310/156.44 |
| 8,089,184 B2 | * | 1/2012 | Yoshida | H02K 3/522 310/216.115 |
| 8,319,390 B2 | * | 11/2012 | Snitchler | H02K 1/165 310/216.097 |
| 8,450,898 B2 | * | 5/2013 | Sears | H02K 3/522 310/194 |
| 2002/0190595 A1 | * | 12/2002 | Han | H02K 17/165 310/156.53 |
| 2004/0012292 A1 | * | 1/2004 | Kometani | H02K 3/28 310/184 |
| 2004/0239200 A1 | * | 12/2004 | Strahan | H02K 21/185 310/162 |
| 2005/0012427 A1 | * | 1/2005 | Seki | H02K 1/145 310/257 |
| 2006/0197478 A1 | | 9/2006 | Wang et al. | |
| 2013/0088114 A1 | | 4/2013 | Yamashita et al. | |
| 2013/0229085 A1 | * | 9/2013 | Zhang | H02K 1/16 310/216.092 |
| 2013/0300249 A1 | * | 11/2013 | Omura | H02K 1/14 310/216.092 |
| 2015/0042194 A1 | | 2/2015 | Li et al. | |
| 2016/0072359 A1 | * | 3/2016 | Kreidler | H02K 21/24 310/68 D |
| 2016/0141922 A1 | * | 5/2016 | Inoue | H02K 19/22 310/216.004 |
| 2016/0315508 A1 | * | 10/2016 | Li | H02K 29/03 |
| 2016/0365756 A1 | * | 12/2016 | Li | H02K 29/03 |
| 2016/0365757 A1 | * | 12/2016 | Li | H02K 1/146 |
| 2016/0365781 A1 | * | 12/2016 | Li | H02K 21/16 |
| 2016/0365782 A1 | * | 12/2016 | Li | H02K 21/16 |
| 2016/0380496 A1 | * | 12/2016 | Hunstable | H02K 21/12 310/179 |
| 2017/0055669 A1 | * | 3/2017 | Li | H02K 29/03 |

FOREIGN PATENT DOCUMENTS

| | | | | |
|---|---|---|---|---|
| EP | 3136562 A1 | * | 3/2017 | ............ H02K 29/03 |
| JP | 11098720 A | * | 4/1999 | |
| JP | 3207419 U | * | 11/2016 | ............ H02K 29/03 |
| WO | WO 8503173 A1 | * | 7/1985 | ........... H02K 7/1185 |
| WO | WO2014-183408 A1 | | 11/2014 | |

* cited by examiner

SINGLE PHASE PERMANENT MAGNET MOTOR AND HAIR DRYER USING THE SAME

CROSS REFERENCE TO RELATED APPLICATIONS

This non-provisional patent application claims priority under 35 U.S.C. § 119(a) from Patent Application No. 201510545984.6 filed in The People's Republic of China on 28 Aug. 2015.

FIELD OF THE INVENTION

The present invention relates to a single phase permanent magnet motor, and in particular to a single phase permanent magnet motor with an even air gap and a hair dryer using the motor.

BACKGROUND OF THE INVENTION

A single phase permanent magnet motor includes a stator and a rotor. The stator includes a stator core and a stator winding wound around the stator core. The stator core includes pole shoes surrounding around the rotor. The pole shoes and the rotor define an air gap there between, for allowing the rotor to rotate relative to the stator.

Traditionally, in order to avoid a startup dead point of the single phase permanent magnet motor, the air gap is often configured to be an uneven air gap or positioning holes or slots are formed on the pole shoes. However, the uneven air gap may lead to unduly large noise and poor performance stability. The presence of the positioning holes or slots requires further processing to the stator core, which results in fabrication process being complicated and fabrication cost being increased.

SUMMARY OF THE INVENTION

In one aspect, a single phase motor is provided which includes a stator and a rotor rotatable relative to the stator. The stator includes a stator core and a stator winding wound around the stator core. The stator core comprises an outer ring portion and a plurality of teeth extending inwardly from the outer ring portion. The rotor comprises a plurality of rotor magnetic poles. Wherein each tooth of the stator comprises a tooth body extending inwardly from the outer ring portion and two pole shoes extending respectively from a distal end of the tooth body in two opposite circumferential directions of the rotor and facing the rotor, and the two pole shoes are asymmetrical about a center line of the tooth body such that when the stator winding is not energized the rotor is capable of stopping at an initial position where a center line of each rotor magnetic pole deviates from the center line of a corresponding tooth body.

Preferably, adjacent pole shoes of two adjacent teeth are separated from each other by a slot opening or connected together through a magnetic bridge, a center of the slot opening or the magnetic bridge is offset from a symmetrical center of the two adjacent teeth.

Preferably, inner circumferential surfaces of the pole shoes are coaxial with the rotor such that an air gap with a substantially even thickness is formed between an outer circumferential surface of the rotor and the inner circumferential surfaces of the pole shoes.

Preferably, the pole shoes of adjacent teeth are separated from each other by a slot opening, and the slot opening has a width less than or equal to four times of the substantially even thickness of the air gap.

Preferably, the slot opening has a minimum width less than or equal to twice of the substantially even thickness of the air gap.

Preferably, the pole shoe has a radial thickness gradually decreasing in a direction away from the tooth body.

Preferably, adjacent pole shoes of two adjacent teeth are separated from each other by a slot opening and an inner surface of the shorter one of the two pole shoes of each tooth forms a chamfer adjacent the slot opening.

Preferably, the stator core is formed by joining a plurality of stator core units along a circumferential direction of the stator, each of the stator core units comprises a tooth with a pole shoe and a yoke segment connected to the tooth, and the yoke segments of the adjacent stator core units are connected together to form the outer ring portion of the stator core.

Preferably, joining faces of the yoke segments of the adjacent stator core units are plane faces or recess-protrusion engaging faces.

Preferably, for each of the stator core units, one end of the tooth is connected to one end of the yoke segment or connected to the yoke segment between two ends of the yoke segment.

Preferably, the center of the slot opening or the magnetic bridge is offset from the symmetrical center of two adjacent teeth by an electric angle ranging from 45 degrees to 135 degrees.

Preferably, the teeth and the outer ring portion are separately formed and adjacent pole shoes of two adjacent teeth are connected together through a magnetic bridge.

Preferably, the distance between outer circumferential surface of the magnetic poles and a central axis of the rotor decreases from a central portion of the outer circumferential surface to an end portion of the outer circumferential surface.

Preferably, the outer circumferential surface of the magnetic pole is symmetrical about the middle radial line of the magnetic pole.

In another aspect, a hair dryer is provided which includes an enclosure, and a heat generating unit, an air supply unit and a control circuit disposed in an interior of the enclosure. The air supplying unit includes a single phase motor and an impeller driven by the single phase motor. The single phase motor comprises a stator and a rotor rotatable relative to the stator. The stator comprises a stator core comprising an outer ring portion and a plurality of teeth extending inwardly from the outer ring portion; and a stator winding wound around the stator core. The rotor comprises a plurality of rotor magnetic poles. Wherein each tooth comprises a tooth body extending inwardly from the outer ring portion, and a large pole shoe and a small pole shoe respectively extending from a distal end of the tooth body in two opposite circumferential directions of the rotor, the pole shoes facing the rotor magnetic poles with an air gap formed therebetween.

Preferably, adjacent pole shoes of two adjacent teeth are separated from each other by a slot opening or connected together through a magnetic bridge, a center of the slot opening or the magnetic bridge is offset from a symmetrical center of the two adjacent teeth such that when the stator winding is not energized the rotor is capable of stopping at an initial position where a center line of each rotor magnetic pole deviates from the center line of a corresponding tooth body.

Preferably, adjacent pole shoes of two adjacent teeth are separated from each other by a slot opening and an inner surface of the small pole shoe forms a chamfer adjacent the slot opening.

Preferably, the air supplying unit further includes a motor holder and a motor cover. The motor holder has a cylindrical shape having one end formed with an opening. A sidewall of the motor holder is formed with a plurality of first apertures. The single phase motor is fixed in the motor holder, and the power output end of the single phase motor is disposed at a closed end of the motor holder. The motor cover includes one end in the form of a hollow cylinder, and the other end of the motor cover is connected to the opening of the motor holder and cooperates with the motor holder to form a Helmholtz resonance cavity. The motor cover is formed with a plurality of second apertures.

In the single phase permanent magnet motor of the present invention, the startup angle and cogging torque of the motor are adjustable by adjusting the location/shape of the slot opening, without the need of additional positioning slots or positioning holes formed at the inner surfaces of the poles shoes. This simplifies the fabrication process, reduces the fabrication cost, and improves the motor startup reliability.

DETAILED DESCRIPTION OF THE PREFERRED EMBODIMENTS

Figure 1:
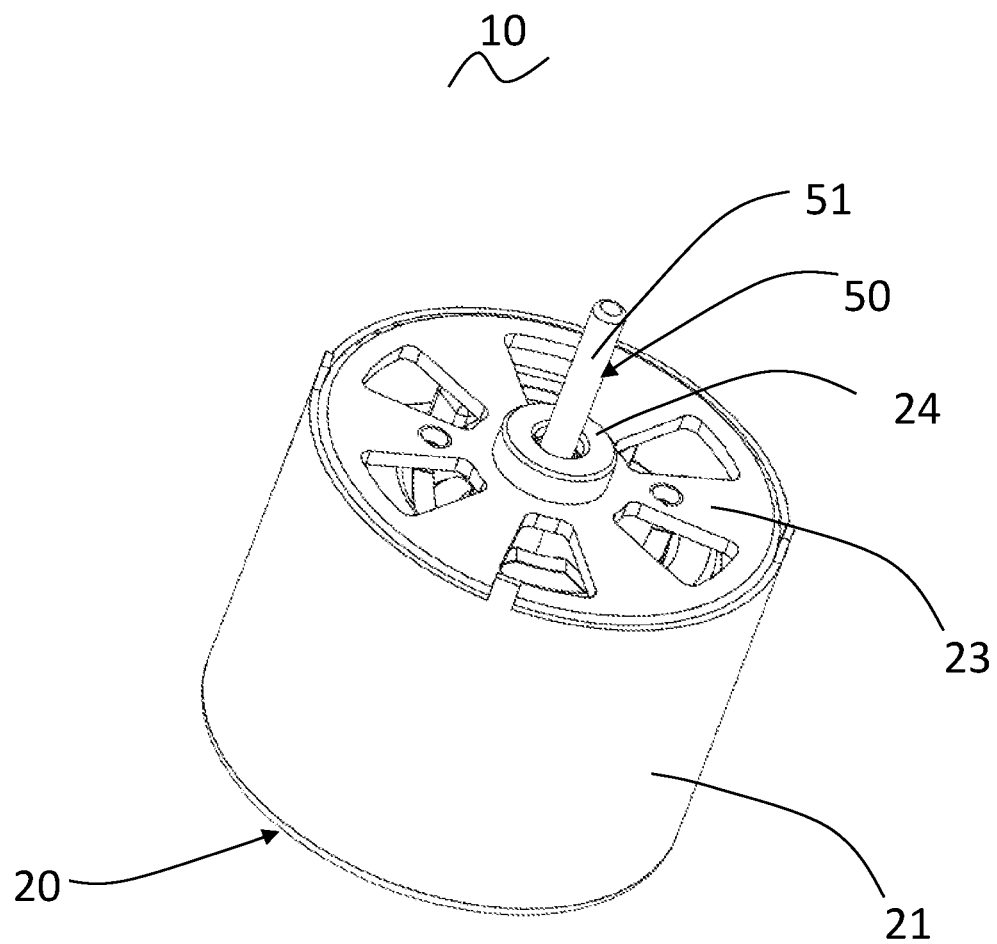
FIG. 1 illustrates a single phase permanent magnet motor according to a preferred embodiment of the present invention.
Figure 2:
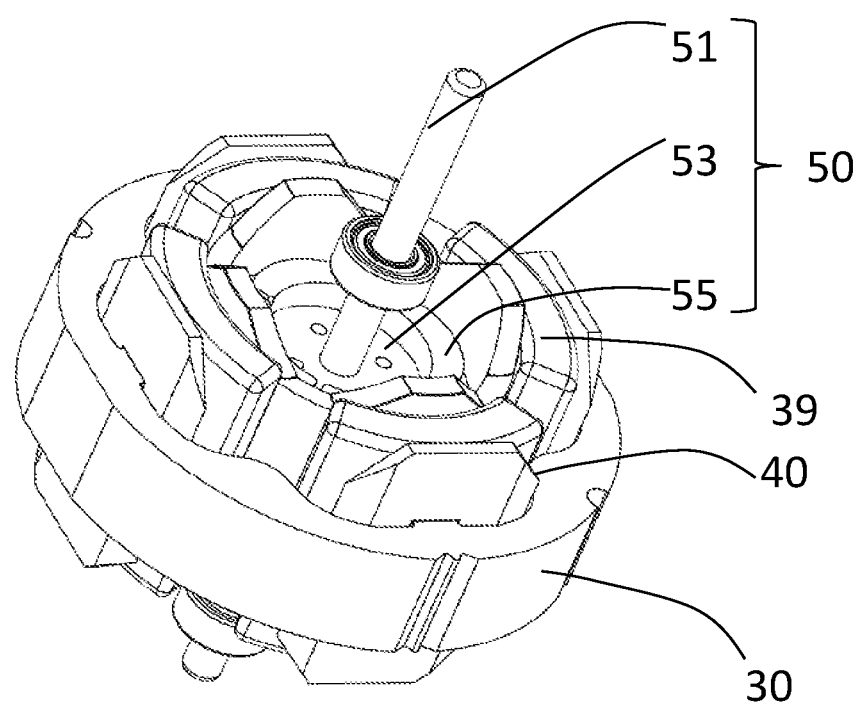
FIG. 2 illustrates the single phase permanent magnet motor of FIG. 1, with the outer housing removed.
Figure 3:
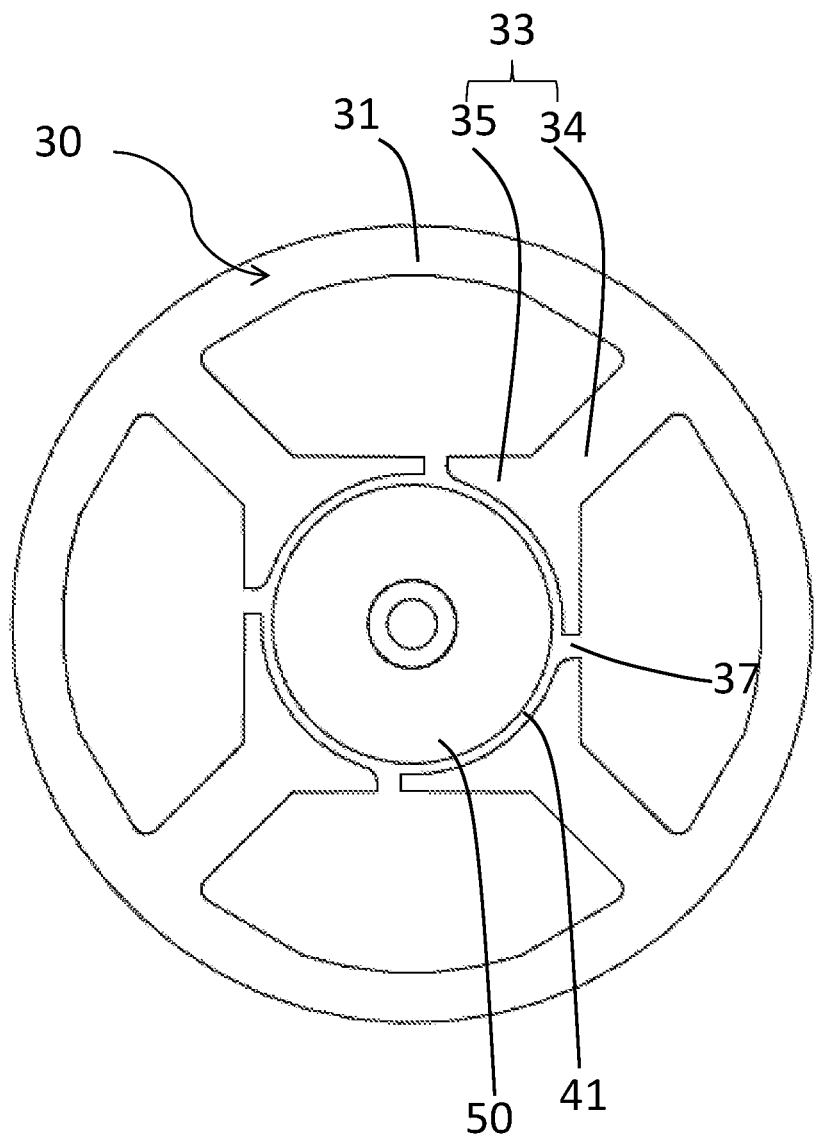
FIG. 3 illustrates the single phase permanent magnet motor of FIG. 1, with the outer housing, stator winding and rotor rotary shaft removed.
Figure 4:
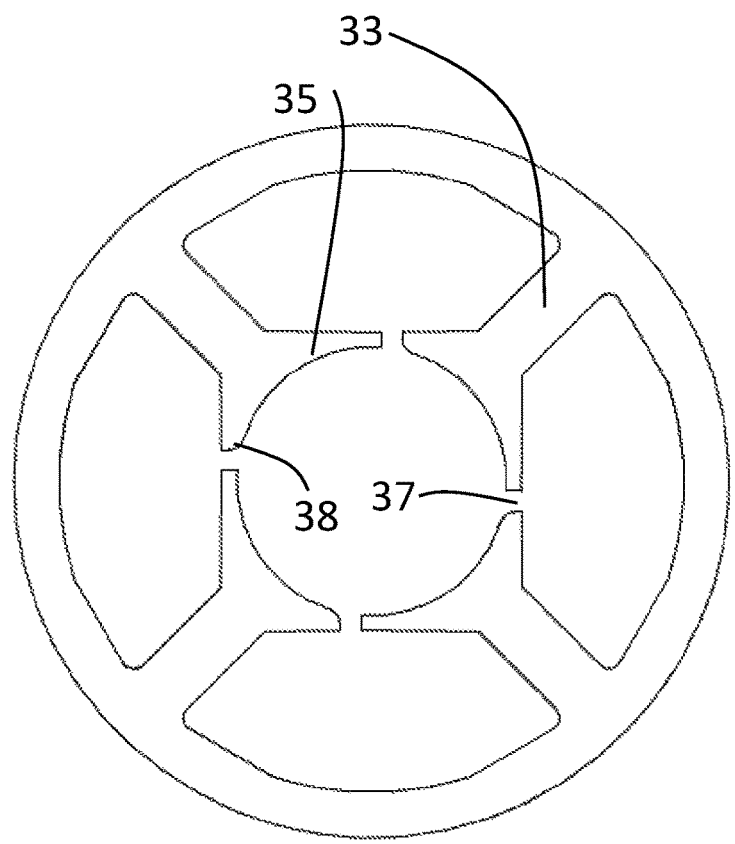
FIG. 4 illustrates a stator core of the single phase permanent magnet motor of FIG. 1

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

First Embodiment

Referring to FIG. 1 to FIG. 5, a single phase motor 10 in accordance with a preferred embodiment of the present invention includes a stator 20 and a rotor 50 rotatable relative to the stator 20. The single phase motor 10 is preferably a single phase permanent magnet direct circuit brushless motor.

The stator 20 includes a cylindrical outer housing 21 with one open end, an end cap 23 mounted to the open end of the outer housing 21, a stator core 30 mounted in the outer housing 21, an insulating bracket 40 mounted to the stator core 30, and a stator winding 39 wound around the stator core 30 and supported by the insulating bracket 40. The stator core 30 includes an outer ring portion 31, a plurality of teeth 33 extending inwardly from the outer ring portion 31. Each tooth 33 comprises a tooth body 34 connected to the outer ring portion 31 and two pole shoes 35 extending respectively from a radial inner end to two circumferential sides of the tooth body 34 of each tooth 33. Preferably, the stator winding 39 is wound around the tooth body of the respective teeth 33. Alternatively, the stator winding 39 may be wound around the outer ring portion 31. A winding slot is formed between each two adjacent teeth 33, and a slot opening 37 of the winding slot is formed between the pole shoes 35 of two adjacent teeth 33. The slot opening 37 is offset from a middle position between the two adjacent teeth, such that the two pole shoes 35 formed at the end of the tooth are asymmetric with respect to a middle radial line of that tooth body 34, thereby forming one pole shoe with a larger cross-sectional area and the other pole shoe with a smaller cross-sectional area.

The stator core 30 is made from a magnetic-conductive material. For example, the stator core 30 is formed by stacking magnetic laminations (silicon laminations commonly used in the industry) along an axial direction of the motor. Preferably, the teeth 33 of the stator core 30 are spacingly and uniformly arranged along the circumferential direction of the motor. Each tooth body 34 extends substantially radially inward from the outer ring portion 31. The pole shoes 35 extend from the radial inner end to two circumferential sides of one corresponding tooth body 34.

Preferably, the pole shoe 35 has a radial thickness gradually decreasing in a direction from the tooth body 34 toward the slot opening 37, such that a magnetic reluctance of the pole shoe 35 gradually increases in the direction from the tooth body 34 toward the slot opening 37.

The rotor 50 is received in a space cooperatively defined by the pole shoes 35 of the teeth 33. The rotor 50 includes a plurality of permanent magnetic poles 55 disposed along a circumferential direction of the rotor. An outer circumferential surface of each permanent magnetic pole 55 is concentric with the inner circumferential surfaces of the pole shoes 35, such that a substantially even air gap 41 (see FIG.

3) is formed between an outer circumferential surface of the rotor and the pole shoes. Specifically, in a radial cross-sectional view, inner surfaces of the pole shoes are located on a circle centered at a center of the rotor 50 and outer surfaces of the permanent magnetic poles 55 are located on a circle centered at the center of the rotor 50. That is, the inner circumferential surfaces of the pole shoes 35 and the outer circumferential surfaces of the permanent magnetic poles 55 are concentric with each other, such that the substantially even air gap is formed between the inner circumferential surfaces of the pole shoes and the outer circumferential surfaces of the permanent magnetic poles 55. Preferably, the slot opening 37 has a width greater than zero and less than or equal to four times of a thickness of the even air gap 41. More preferably, a minimum width of the slot opening 37 of the winding slot is less than or equal to three times of the thickness of the air gap 41, and yet still more preferably, twice of the thickness of the air gap 41. This configuration can make startup and rotation of the rotor smoother, improve the startup reliability of the motor, and avoid the rotor stopping at the startup dead point. The ring portion as used in this disclosure refers to a closed structure formed by extending continuously along the circumferential direction, which includes circular-ring portion, square ring portion or polygonal ring portion. The thickness of the even air gap 41 refers to a radial thickness of the air gap.

Figure 5:
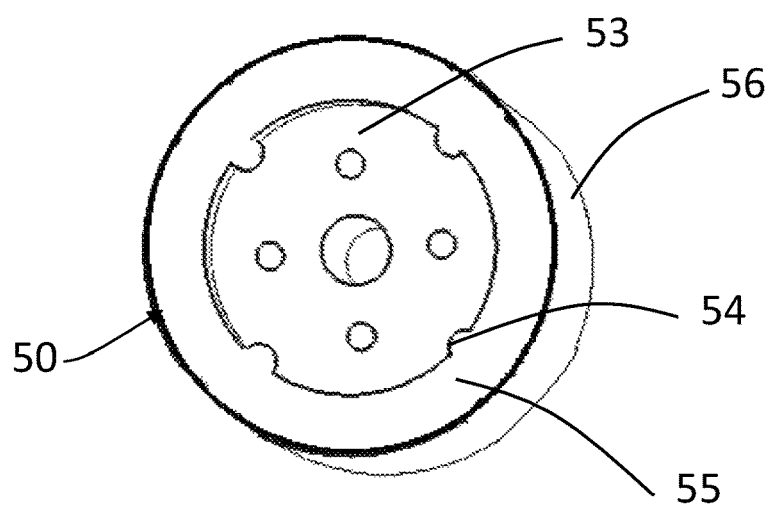
FIG. 5 illustrates the rotor core of the single phase permanent magnet motor of FIG. 1 and its permanent magnetic poles.
Figure 8:
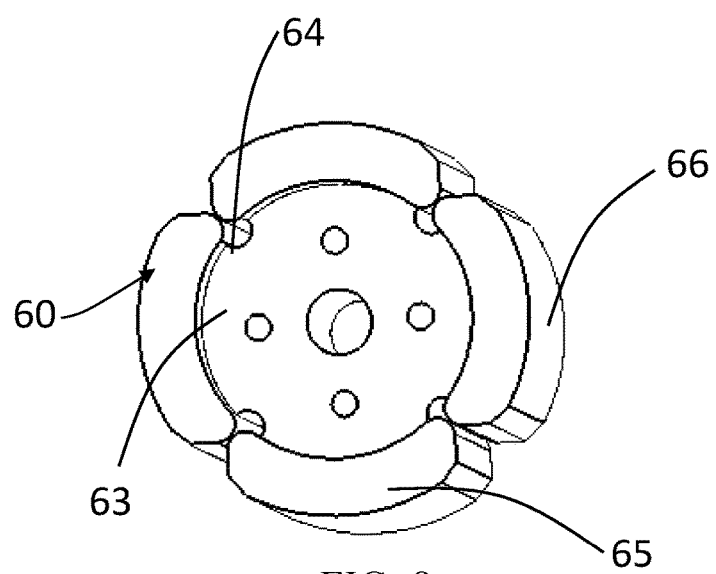
FIG. 8 illustrates a rotor core and its permanent magnet according to the second embodiment of the present invention.

As shown in FIG. 5, the permanent magnetic poles 55 may be formed by a single ring permanent magnet. It should be understood that the permanent magnetic poles 55 may also be formed by multiple individual permanent magnets as shown in FIG. 8. The rotor 50 further includes a rotary shaft 51 passing through the ring permanent magnet 55. One end of the rotary shaft 51 is mounted to the end cap 23 of the stator through a bearing 24, and the other end is mounted to a bottom of the cylindrical outer housing 21 of the stator through another bearing, such that the rotor is capable of rotation relative to the stator.

In this embodiment, the rotor 50 further includes a rotor core 53, and the rotary shaft 51 passes through and is fixed to a center of the rotor core 53. The permanent magnet is mounted to an outer circumferential surface of the rotor core 53. The outer circumferential surface of the rotor core is formed with a plurality of axially-extending grooves 54. Each groove 54 is disposed at a junction of two adjacent permanent magnetic poles to reduce magnetic leakage.

In this embodiment, the slot opening 37 is offset from a middle position between the two adjacent teeth, i.e. the slot opening 37 is spaced from the two adjacent tooth bodies by different distances. Therefore, the two pole shoes extending from the distal end of each tooth body to circumferential sides have a different circumferential length. This configuration can cause an initial position of the rotor to be offset from the dead point. Preferably, an inner surface of the shorter pole shoe, 35 forms a chamber 38 adjacent the slot opening 37. The presence of the chamfer 38 can further reduce the area of the shorter pole shoe, which further increases the degree of non-uniformity between the two pole shoes and hence causes the initial position of the rotor to be further offset from the dead point.

Figure 6:
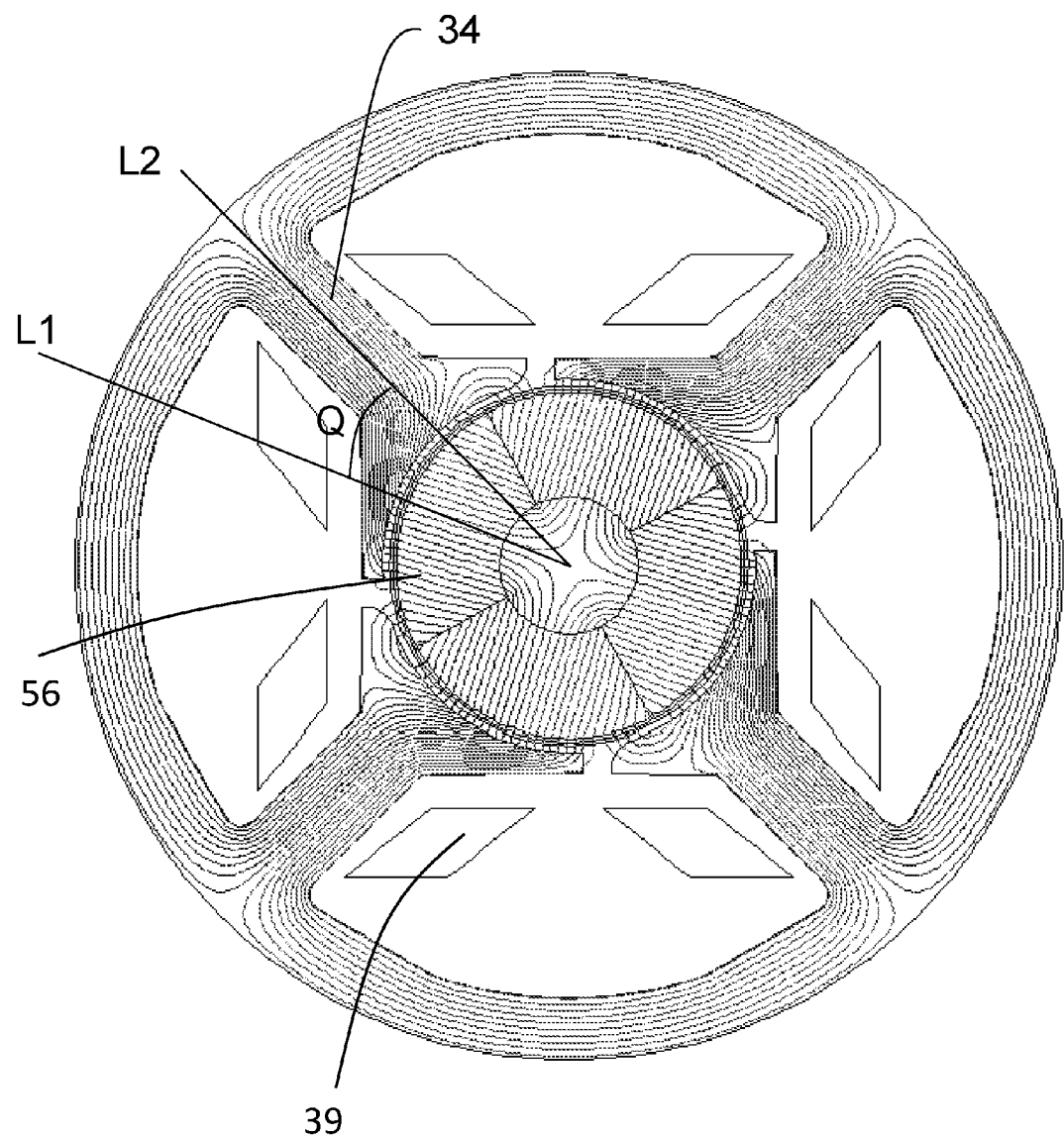
FIG. 6 illustrates a distribution of magnetic line of the rotor permanent magnetic pole of the single phase permanent magnet motor of the present invention.

FIG. 6 illustrates a distribution of magnetic flux of the rotor permanent magnetic pole when the stator winding is not energized, i.e. at the initial position. As shown in FIG. 6, the rotor includes four permanent magnetic poles, with N and S polarities alternatively arranged. The stator includes four teeth forming four stator poles. As can be seen from FIG. 6, when the motor is at the initial position, the magnetic flux passing through the larger area pole shoe are obviously more than the magnetic flux passing through the smaller area pole shoe. A middle radial line L1 of the rotor magnetic pole is offset from a middle radial line L2 of the stator pole by an angle, and the angle Q formed between the middle radial line L1 and the middle radial line L2 is called a startup angle. In this embodiment, the startup angle is greater than a 45-degree in electric angle and less than a 135-degree in electric angle. When the stator winding of the motor is supplied with an electric current in one direction, the rotor 50 can be started along one direction. When the stator winding of the motor is supplied with an electric current in an opposite direction, the rotor 50 can be started along an opposite direction. It should be understood that, when the startup angle is a 90-degree electric angle, the rotor 50 can be easily started in both directions, i.e. it is the easiest angle to achieve bidirectional startup. When the startup angle is offset from the 90-degree electric angle, the rotor is easier to start in one direction than in the opposite direction. It has been found from a large number of experiments that, when the startup angle is in the range of 45-degree to 135-degree electric angle, the startup of the rotor in both directions has good reliability.

Second Embodiment

Figure 7:
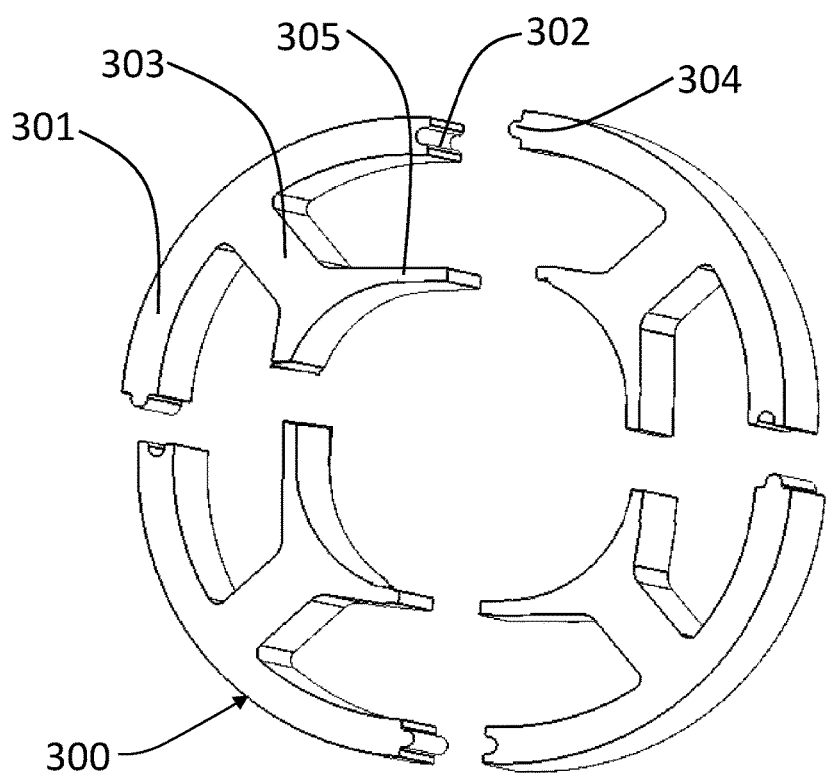
FIG. 7 illustrates a stator core of a single phase permanent magnet motor according to a second embodiment of the present invention.

Referring to FIG. 7, different from the first embodiment, in order to increase the winding efficiency of the stator winding 39, the stator core of the second embodiment includes a plurality of stator core units 300 joined along a circumferential direction of the stator. Each stator core unit 300 includes a tooth 303 with a pole shoe 305, and a yoke segment 301 integrally connected with the tooth 303. The yoke segments 301 of adjacent stator core units are connected together to form the outer ring portion of the stator core. It should be understood that, each stator core unit may also include more than one tooth 303 and corresponding pole shoes 305. After the winding process of all stator core units is completed, the stator core units 300 are joined, thus achieving the stator core with the stator winding. In this embodiment, each stator core unit 300 includes one tooth 303 and its corresponding pole shoe 305, and in each stator core unit 300, one end of the tooth 303 is connected to the yoke segment 301 between two ends thereof.

In this embodiment, the yoke segments 301 of the adjacent stator core units can be fixedly coupled with each other by welding and/or via a conventional mechanical connection structure. FIG. 7 shows an exemplary mechanical connection structure which includes a protrusion 304 engaged in a recess 302. Specifically, each yoke segment 301 of the outer ring portion has a recess 302 formed at one end thereof and a protrusion 304 at the other end thereof. The protrusion 304 of each segment 301 is engaged in the recess 302 of a corresponding adjacent segment 301.

Because the stator core is formed by joining multiple stator core units 300, the slot opening between the adjacent pole shoes 305 can have a very small width. Preferably, a minimum width of the slot opening is greater than zero and less than or equal to three times of a minimum thickness of the air gap. More preferably, the minimum width of the slot opening of the winding slot is greater than zero and less than or equal to twice of the minimum thickness of the air gap. In this embodiment, the width of the slot opening refers to the distance between the two adjacent pole shoes 305.

Referring to FIG. 8, the rotor 60 of this embodiment includes a rotor core 63 and permanent magnetic poles 65 arranged along the circumferential direction of the rotor core 63. The permanent magnetic poles 65 are formed by a plurality of permanent magnets 66, for example four permanent magnets. The permanent magnets 66 are mounted to an outer circumferential surface of the rotor core 63. Likewise, the outer circumferential surface of the rotor core 63 is formed with a plurality of axially-extending grooves 64. Each groove 64 is disposed at a junction of adjacent two permanent magnets 66 to reduce magnetic leakage. In this case, the inner circumferential surfaces of the pole shoes are located on a circle centered at the center of the rotor 60, and outer surfaces of the permanent magnets 66 cooperatively define a cylindrical surface, thus forming an even air gap between the pole shoes and the permanent magnets.

Third Embodiment

Figure 9:
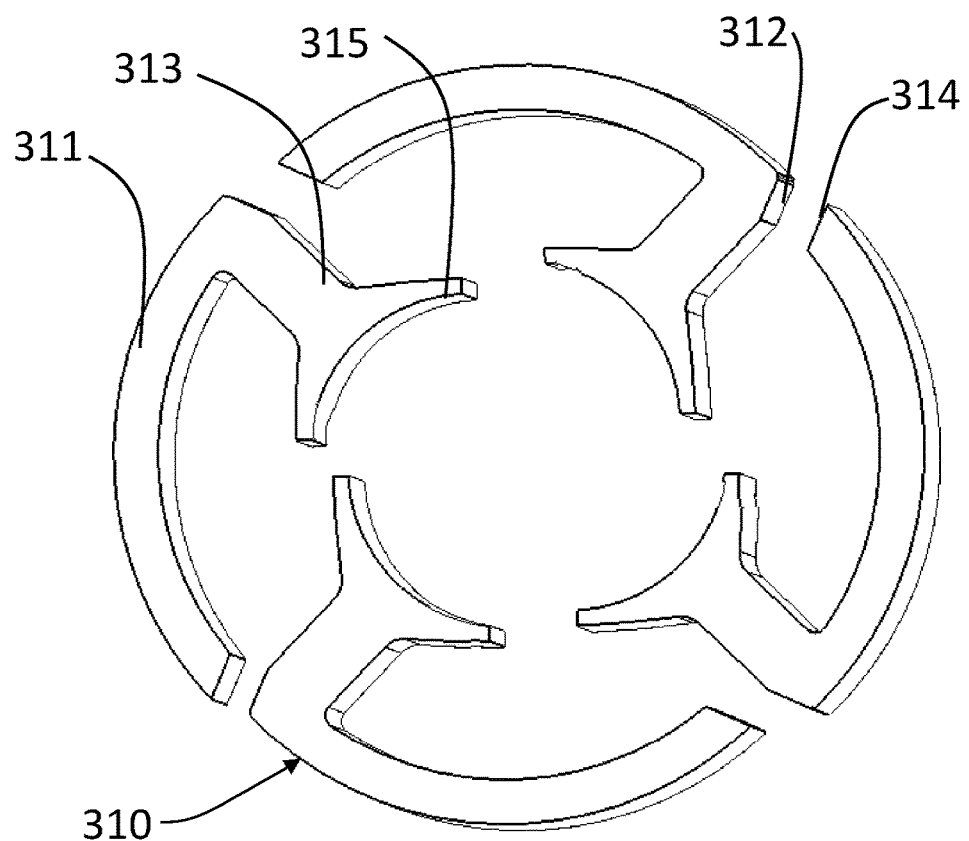
FIG. 9 illustrates a stator core of a single phase permanent magnet motor according to a third embodiment of the present invention.

Referring to FIG. 9, in this embodiment, the stator core includes a plurality of stator core units 310 joined along the circumferential direction of the stator. Each stator core unit 310 includes a tooth 313 with a pole shoe 315, and a yoke segment 311 integrally connected with the tooth 313. The yoke segments 311 of adjacent stator core units are connected together to form the outer ring portion of the stator core. It should be understood that, each stator core unit may also include more than one tooth 313 and corresponding pole shoes 315. After the winding process of all stator core units is completed, the stator core units 300 are joined, thus achieving the stator core having the stator winding. In this embodiment, each stator core unit 310 includes one tooth 313 and its corresponding pole shoe 315, and in each stator core unit 310, one end of the tooth 313 is connected to the yoke segment 311 between two ends of the segment 311.

In this embodiment, the joining faces of the yoke segments 311 of the adjacent stator core units are plane faces, and the adjacent yoke segments 311 can be assembled together directly by welding or in another manner. Preferably, in order to achieve better end to end contact between the adjacent arcuate yoke segments, the ends of the yoke segments 311 of the adjacent stator core units are provided with inter-engagement chamfers. Specifically, the two ends of the yoke segment of each stator core unit are respectively provided with a first chamfer 312 and a second chamfer 314 that are in close contact with each other.

Because the stator core is formed by joining multiple stator core units 310, the slot opening between the adjacent pole shoes 315 can have a very small width. Preferably, a minimum width of the slot opening of the winding slot is greater than zero and less than or equal to three times or twice of a minimum thickness of the air gap.

In the single phase permanent magnet motor of this invention, the winding slot is formed between two adjacent teeth, the slot opening is located between the pole shoes of the two adjacent teeth and is closer to one of the two teeth. Therefore, the startup angle and cogging torque required for the startup of the single phase permanent magnet motor can be adjusted by adjusting the position and width of the slot opening, without the need of additional positioning slots or positioning holes. For example, the startup angle is adjusted by adjusting the degree of offset of the slot opening from one of the teeth. When the startup angle is in the range of 45-degree to 135-degree electric angle, the rotor of the motor can be started in both directions, which makes the startup reliable.

Figure 10:
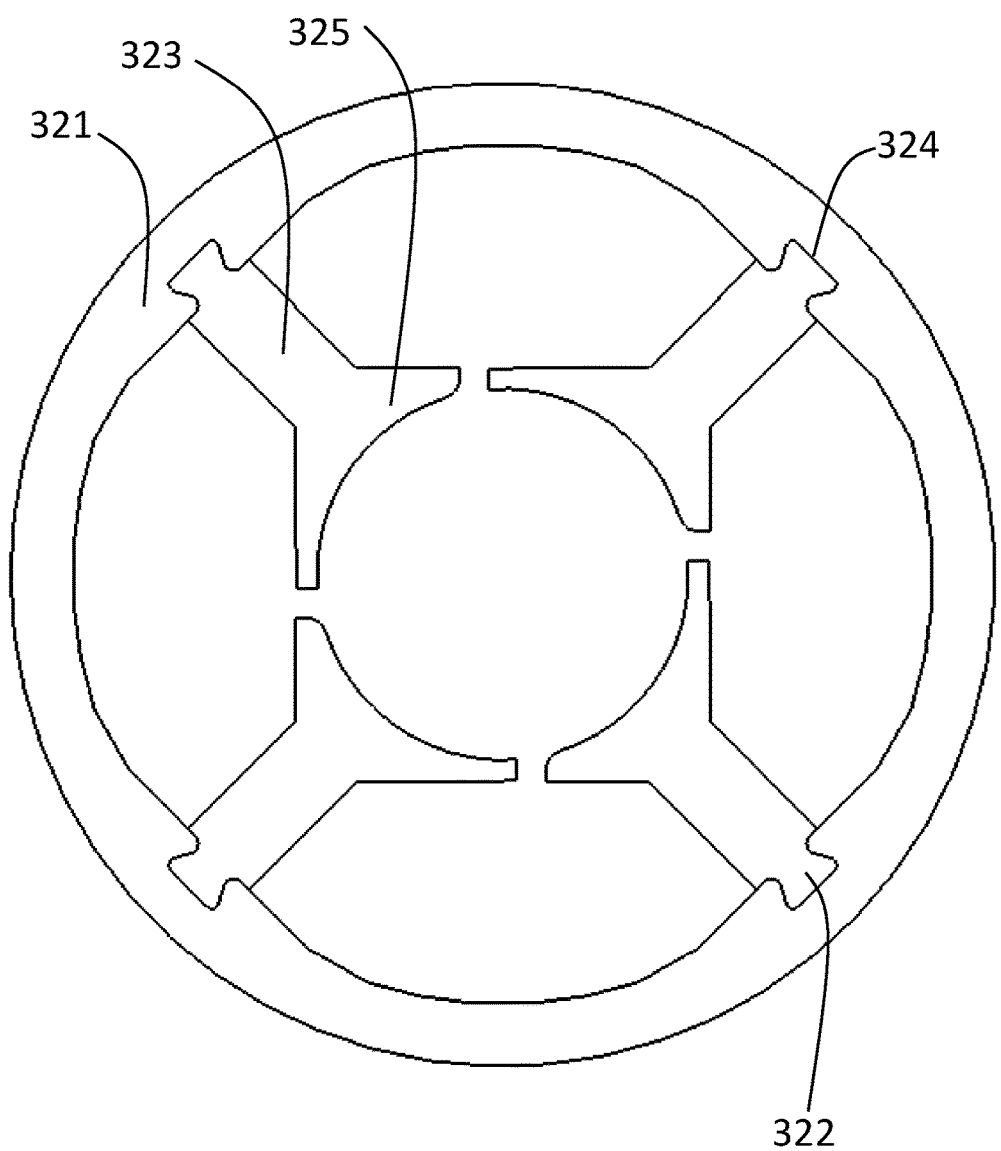
FIG. 10 illustrates a stator core of a single phase permanent magnet motor according to a fourth embodiment of the present invention.

Referring to FIG. 10, likewise, the stator core of this embodiment is of a separate-type structure in order to increase the winding efficiency of the stator winding. Specifically, the teeth 323 and associated pole shoes 325 are integrally formed into a single integral structure, while the teeth 323 and the outer ring portion 321 are separate structures, i.e. the outer ring portion 321 and the teeth 323 are separately formed and then assembled together. The joining faces of the teeth 323 and the outer ring portion 321 can be plane joining faces or concave-convex joining faces with a convex joining surface 322 formed at one of the tooth 323 and the outer ring portion 321 and a concave joining surface 324 formed at the other of the tooth 323 and the outer ring portion 321. It should be understood that each tooth 323 may be fixedly connected to the outer ring portion 321 by welding or various mechanical connecting manners (e.g. a dovetail joint). In an alternative embodiment, the teeth 323, outer ring portion 321 and the associated pole shoes 325 are all separately formed, and the teeth 323 are fixedly connected to the outer ring portion 321 and the pole shoes 325 after the stator winding 39 is wound.

In the single phase permanent magnet motor exemplified above, the inner surfaces of the pole shoes of the stator core and the outer surfaces of the rotor permanent magnetic poles are respectively located on two concentric circles centered at the center of the rotor, thus forming the substantially even air gap between the stator and the rotor (the reason of the term "substantially even air gap" is that, although the size of the air gap at the area corresponding to the slot opening 37 is not equal to the size of the air gap at the area corresponding to other portions, and the size of the air gap at the area corresponding to the chamfer of the magnet end is not equal to the size of the air gap at the area corresponding to other portions, the size of the air gap at the areas corresponding to the slot openings and the magnet ends occupies a very small ratio in the total length of the air gap). The width of the slot opening is less than or equal to four times of the thickness of the even air gap, thereby reducing the vibration and noise caused by large slot opening and non-uniform air gap in the prior art. The stator core is of a separate structure, such that the winding process can be performed easily and efficiently before the teeth and the outer ring portion are assembled. Thereby, an efficiency of the winding process can advantageously be improved.

In the above embodiments, the slot opening 37 has an even circumferential width. It should be understood that, alternatively, each slot opening 37 may has an uneven width, e.g. has a trumpet-shape with narrow inside and wide outside. In this case, the width of the slot opening 37 refers to a minimum width of the slot opening. In the above embodiment, the slot opening 37 is formed along the axial direction of the motor. Alternatively, the slot opening 37 may be formed along a direction deviating from the axial direction of the motor.

Fifth Embodiment

Figure 11:
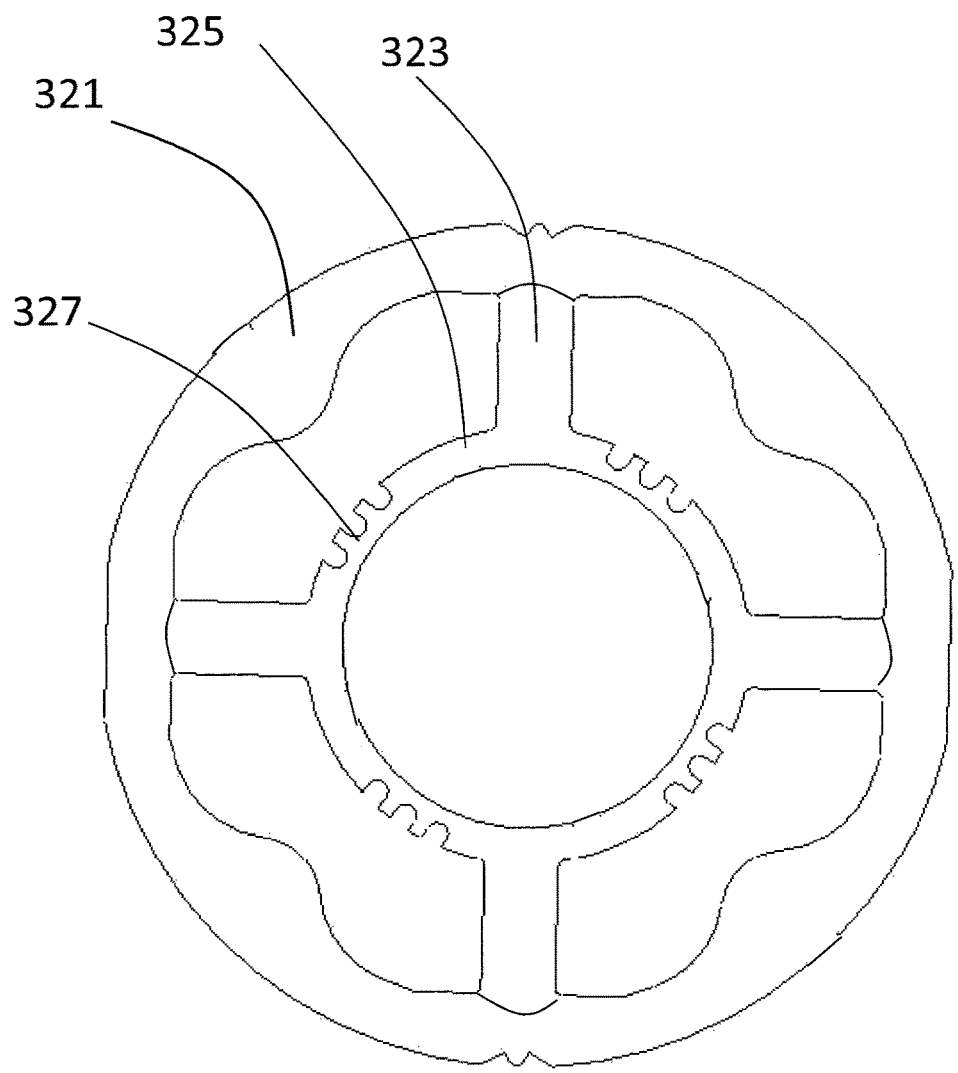
FIG. 11 illustrates a stator core of a single phase permanent magnet motor according to a fifth embodiment of the present invention.

It should be understood that, in the above embodiments, the adjacent pole shoes 325 of the adjacent tooth 323 may also be connected through a magnetic bridge 327. As shown in FIG. 11, the magnetic bridge 327 and the pole shoes of the teeth 323 are connected into an inner ring portion. The teeth and the outer ring portion 321 may be separately formed.

Sixth Embodiment

Figure 12:
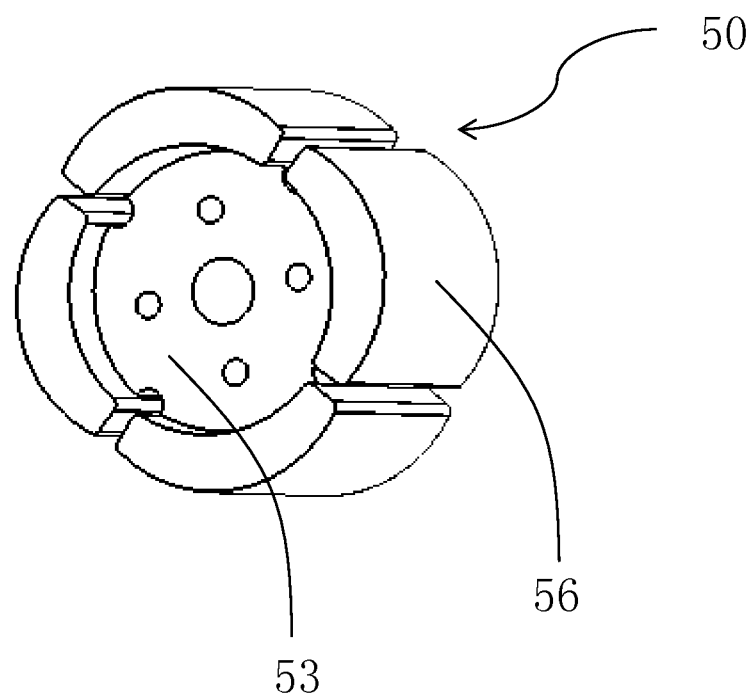
FIG. 12 is an exemplary detail drawing illustrating another alternative embodiment of the rotor.

FIG. 12 is an exemplary detail drawing illustrating another alternative embodiment of the rotor 50. As shown in FIG. 12, the magnetic pole 56 is disposed at a non-uniform distance from the central axis of the rotor. In other words, the distance between the outer circumferential surface of the magnetic pole 56 and the central axis of the rotor shaft 51 can vary circumferentially from a central portion of the outer circumferential surface of the magnetic pole 56 to an end portion of the outer circumferential surface of the magnetic pole 56. The distance between the outer circumferential surface of the magnetic pole 56 and the central axis of the rotor shaft 51 decreases from the central portion of the outer circumferential surface to the end portion of the outer circumferential surface. As a result, the air gap formed between the outer circumferential surface of the magnetic pole 56 of the rotor and the inner circumferential surfaces of the pole shoes of the stator can be smaller at the middle portion of the outer circumferential surface of the magnetic pole 56 than at the end portion of outer circumferential surface of the magnetic pole 56. For example, in a radial direction, a width of the air gap 130 at the end portion of the outer circumferential surface and a width of the air gap 130 at the middle portion of the outer circumferential surface can have a ratio ranging from 5:1 to 1.5 to 1. Preferably, the outer circumferential surface of the magnetic pole is symmetrical about the middle radial line of the magnetic pole.

Figure 13:
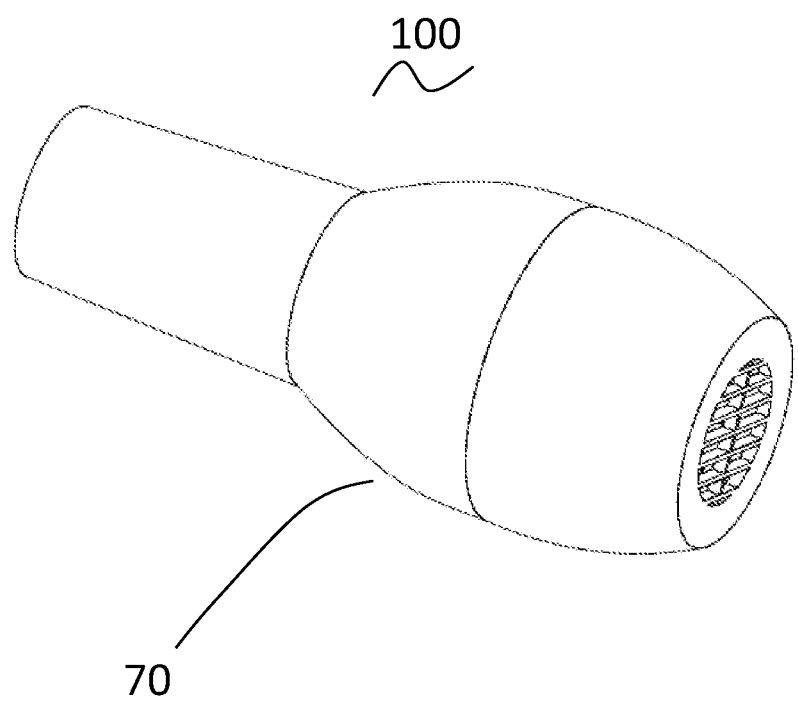
FIG. 13 illustrates a hair dryer according to a preferred embodiment of the present invention.
Figure 14:
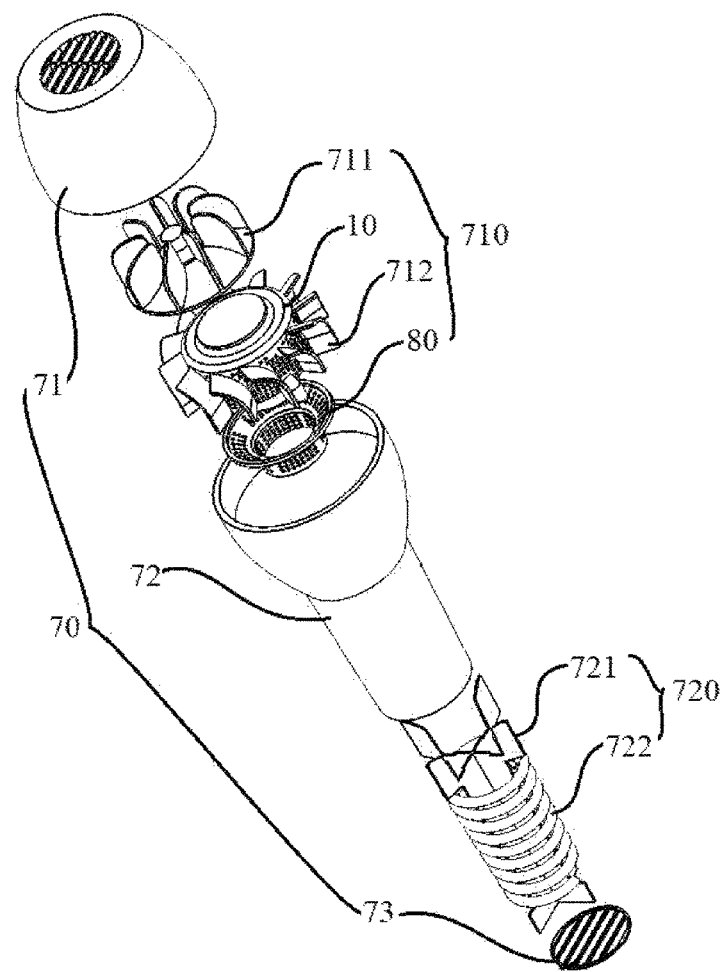
FIG. 14 illustrates an exploded view of the hair dryer of FIG. 13.
Figure 15:
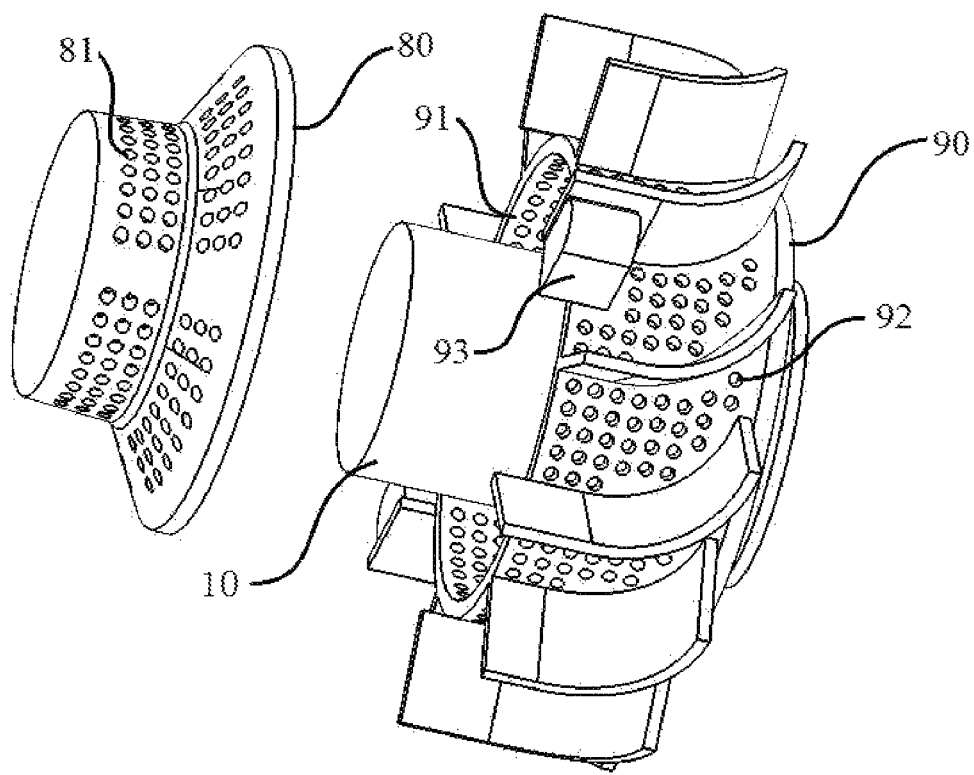
FIG. 15 illustrates a part structure of the hair dryer of FIG. 13.

Referring to FIG. 13 to FIG. 15, the present invention further provides a hair dryer 100 which includes an enclosure 70, and a heat generating unit 720, an air supply unit 710, and a control unit (not shown in the figure) disposed in an interior of the enclosure. The air supply unit 710 includes any one of the above single phase permanent magnet motors 10 and an impeller 711. The impeller 711 is connected to the power output end of the single phase permanent magnet motor 10.

The air supplying unit 710 further includes a motor holder 90 and a motor cover 80. The motor holder 90 has a cylindrical shape having one end formed with an opening 91. A sidewall of the motor holder 90 is formed with a plurality of first apertures 92. The single phase permanent magnet motor 10 is fixed in the motor holder 90, and the power output end of the single phase permanent magnet motor is disposed at a closed end of the motor holder. The motor cover 80 includes one end in the form of a hollow cylinder, and the other end is connected to the opening 91 of the motor holder 91 and cooperates with the motor holder to form a Helmholtz resonance cavity. The motor cover is formed with a plurality of second apertures 81.

In this embodiment, the material of the motor holder 90 and the motor cover 80 is photosensitive resin. The hollow cylinder of the motor cover 80 has a diameter less than a diameter of the opening 91 of the motor holder 90. In addition, a locking piece 93 is disposed at the end of the motor holder 90 that forms the opening, for locking the motor holder 90 with the motor cover 80. It should be understood that the motor holder 90 and the motor cover 80 may be connected in another connecting manner, such as but not limited to by screw connection. Preferably, a plurality of air guide plates 712 is disposed on an outer wall of the motor holder 90.

The heat generating unit 720 includes more than two heater plates 721 and a spring 722 attached around the heater plates. Two ends of the heater plates 721 are not received in the spring and extend in a direction perpendicular to a compression direction of the spring, thereby preventing the spring 722 from sliding out of the heater plates.

The outer housing 70 includes a first housing 71 and a second housing 72 that are interconnected. The first housing 71 covers the impeller 711, and the second housing 72 covers the air supplying unit 710 and the heat generating unit 720. The outer housing 70 further includes a bottom plate 73 disposed at a distal end of the second housing 72 as an air outlet of the electric hair dryer. A handle, not illustrated in the figure, may be provided on the outer housing 70. When necessary, one half of the handle may be disposed on the first housing 71, the other half may be disposed on the second outer housing 72, and the two halves are then assembled together.

Although the invention is described with reference to one or more preferred embodiments, it should be appreciated by those skilled in the art that various modifications are possible. Therefore, the scope of the invention is to be determined by reference to the claims that follow.

The invention claimed is:

1. A single phase motor comprising
a stator comprising:
   a stator core comprising an outer ring portion and a plurality of teeth extending inwardly from the outer ring portion; and
   a stator winding wound around the stator core; and
a rotor rotatable relative to the stator, the rotor comprising a plurality of rotor magnetic poles;
wherein each tooth of the stator comprises a tooth body extending inwardly from the outer ring portion and two pole shoes extending respectively from a distal end of the tooth body in two opposite circumferential directions of the rotor and facing the rotor, and the two pole shoes are asymmetrical about a center line of the tooth body such that when the stator winding is not energized the rotor is capable of stopping at an initial position where a center line of each rotor magnetic pole deviates from the center line of a corresponding tooth body.

2. The single phase motor of claim 1, wherein adjacent pole shoes of two adjacent teeth are separated from each other by a slot opening or connected together through a magnetic bridge, a center of the slot opening or the magnetic bridge is offset from a symmetrical center of the two adjacent teeth.

3. The single phase motor of claim 1, wherein inner circumferential surfaces of the pole shoes are coaxial with the rotor such that an air gap with a substantially even thickness is formed between outer circumferential surfaces of the rotor magnetic poles and the inner circumferential surfaces of the pole shoes.

4. The single phase motor of claim 3, wherein adjacent pole shoes of two adjacent teeth are separated from each other by a slot opening, and the slot opening has a width less than or equal to four times of the thickness of the air gap.

5. The single phase motor of claim 3, wherein adjacent pole shoes of two adjacent teeth are separated from each other by a slot opening, and the slot opening has a minimum width less than or equal to twice of the thickness of the air gap.

6. The single phase motor of claim 1, wherein each of the two pole shoes has a radial thickness gradually decreasing in a direction away from the tooth body.

7. The single phase motor of claim 1, wherein adjacent pole shoes of two adjacent teeth are separated from each other by a slot opening, the two pole shoes of each tooth comprises a shorter pole shoe and a longer pole shoe, and an inner surface of the shorter pole shoe forms a chamfer adjacent the slot opening.

8. The single phase motor of claim 1, wherein the stator core is formed by joining a plurality of stator core units along a circumferential direction of the stator, each of the stator core units comprises a tooth with a pole shoe and a yoke segment connected to the tooth, and yoke segments of adjacent stator core units are connected together to form the outer ring portion of the stator core.

9. The single phase motor of claim 8, wherein joining faces of the yoke segments of the adjacent stator core units are plane faces or recess-protrusion engaging faces.

10. The single phase motor of claim 8, wherein for each of the stator core units, one end of the tooth is connected to one end of the yoke segment or connected to the yoke segment between two ends of the yoke segment.

11. The single phase motor of claim 2, wherein the center of the slot opening or the magnetic bridge is offset from the symmetrical center of two adjacent teeth by an electric angle ranging from 45 degrees to 135 degrees.

12. The single phase motor of claim 1, wherein the teeth and the outer ring portion are separately formed and adjacent pole shoes of two adjacent teeth are connected together through a magnetic bridge.

13. The single phase motor of claim 1, wherein a distance between outer circumferential surface of the rotor magnetic poles and a central axis of the rotor decreases from a central portion of the outer circumferential surface to an end portion of the outer circumferential surface.

14. The single phase motor of claim 13, wherein the outer circumferential surface of the magnetic pole is symmetrical about a middle radial line of the magnetic pole.

15. A hair dryer comprising an enclosure, a heat generating unit, an air supply unit and a control unit disposed in an interior of the enclosure, the air supply unit comprising a single phase motor and an impeller driven by the single phase motor, the single phase motor comprising:
    a stator comprising:
        a stator core comprising an outer ring portion and a plurality of teeth extending inwardly from the outer ring portion; and
        a stator winding wound around the stator core; and
    a rotor rotatable relative to the stator, the rotor comprising a plurality of rotor magnetic poles;
    wherein each tooth comprises a tooth body extending inwardly from the outer ring portion, and a large pole shoe and a small pole shoe respectively extending from a distal end of the tooth body in two opposite circumferential directions of the rotor, the pole shoes facing the rotor magnetic poles with an air gap formed there between.

16. The hair dryer of claim 15, wherein adjacent pole shoes of two adjacent teeth are separated from each other by a slot opening or connected together through a magnetic bridge, a center of the slot opening or the magnetic bridge is offset from a symmetrical center of the two adjacent teeth such that when the stator winding is not energized the rotor is capable of stopping at an initial position where a center line of each rotor magnetic pole deviates from the center line of a corresponding tooth body.

17. The hair dryer of claim 15, wherein adjacent pole shoes of two adjacent teeth are separated from each other by a slot opening and an inner surface of the small pole shoe forms a chamfer adjacent the slot opening.

18. The hair dryer of claim 15, wherein the air supply unit further includes a motor holder and a motor cover, the motor holder has a cylindrical shape having one end formed with an opening, a sidewall of the motor holder is formed with a plurality of first apertures, the single phase motor is fixed in the motor holder, and a power output end of the single phase motor is disposed at a closed end of the motor holder, the motor cover includes one end in a form of a hollow cylinder, and another end of the motor cover is connected to the opening of the motor holder and cooperates with the motor holder to form a Helmholtz resonance cavity, the motor cover is formed with a plurality of second apertures.

19. The hair dryer of claim 15, wherein the single phase motor is a single phase permanent magnet direct circuit brushless motor.

* * * * *